United States Patent

Steinl

Patent Number: 6,056,537

Date of Patent: May 2, 2000

[54] INJECTION MOULDING DEVICE HAVING TEMPERATURE CONTROL TO PREVENT VULCANIZATION

[76] Inventor: Alfred Steinl, Rebenring 64, 84032 Altdorf, Germany

[21] Appl. No.: 09/101,743

[22] PCT Filed: Jan. 14, 1997

[86] PCT No.: PCT/EP97/00141

§ 371 Date: Jul. 17, 1998

§ 102(e) Date: Jul. 17, 1998

[87] PCT Pub. No.: WO97/26125

PCT Pub. Date: Jul. 24, 1997

[30] Foreign Application Priority Data

Jan. 17, 1996 [DE] Germany .......................... 196 01 556

[51] Int. Cl.[7] ............................................. B29C 45/20
[52] U.S. Cl. ................................. 425/562; 425/563
[58] Field of Search ...................... 425/562, 563

[56] References Cited

U.S. PATENT DOCUMENTS

| | | |
|---|---|---|
| 3,295,169 | 1/1967 | Moslo . |
| 3,398,436 | 8/1968 | Nouel . |
| 3,918,870 | 11/1975 | Tetzlaff . |
| 4,286,941 | 9/1981 | Gellert . |

FOREIGN PATENT DOCUMENTS

| | | |
|---|---|---|
| 00 013 118 | 12/1978 | European Pat. Off. . |
| 0 010 887 | 5/1980 | European Pat. Off. . |
| 0 287 001 | 4/1988 | European Pat. Off. . |
| 0 375 583 | 12/1989 | European Pat. Off. . |
| 2 242 223 | 3/1975 | France . |
| 1 778 033 | 3/1968 | Germany . |
| 28 35 805 A1 | 8/1978 | Germany . |
| 141 805 | 5/1980 | Germany . |
| 91 10 240 | 8/1991 | Germany . |
| 43 04 489 A1 | 2/1993 | Germany . |
| 196 01 556 A1 | 1/1996 | Germany . |

*Primary Examiner*—Tim Heitbrink
*Attorney, Agent, or Firm*—Pitney, Hardin, Kipp & Szuch, LLP

[57] ABSTRACT

The invention concerns an injection molding device which has an injection unit (1) comprising an injection cylinder (20) and an injection piston (10) travelling inside it. The injection cylinder can be filled via a filling channel (12) arranged in the injection piston and can be emptied via an outlet opening (24) in the injection cylinder. An opening (14) in the filling channel (12) is spatially and/or thermally seperated from the outlet opening (24). Thus there exists the possibility of the complete vulcanization of the material in the outlet opening.

15 Claims, 6 Drawing Sheets

INJECTION MOULDING DEVICE HAVING TEMPERATURE CONTROL TO PREVENT VULCANIZATION

BACKGROUND OF THE INVENTION

1. Field of the Invention

The invention relates to an injection molding device; in particular, for rubber, caoutchouc or similar materials such as elastomers, thermoset plastics and cross-linkable polymers.

2. Description of the Related Art

EP 0 287 001 A1 relates to a device for the injection molding of materials which comprises a plasticizing unit having an extruder outlet, the device further comprising an injection unit having an injection piston and an injection channel having a discharge opening. The extruder opening of the plasticizing unit is connected to the discharge opening of the injection piston for filling the injection unit. For the injection process, the extruder outlet is separated from the discharge opening and the injection channel is connected to a mold.

DE 91 10 240 U1 describes an injection molding device in which the plasticizing unit is firmly connected to an injection piston through which a feed channel passes leading into the injection cylinder. The end turning away from the injection cylinder is connected to an extruder outlet of the plasticizing unit. The mouth of the feed channel is located at the tip of the free end of the injection piston which tip is conically shaped. The bottom surface of the injection cylinder is formed by an insert and has a conical shape which corresponds to the shape of the free end of the injection piston. A discharge opening in the insert is aligned with the mouth of the feed channel in the injection piston. For filling the injection unit, the discharge opening is closed with a locking bar and material is fed from the plasticizing unit into the injection cylinder via the extruder outlet and the feed channel, the injection piston travelling accordingly. After that, the locking bar is drawn back and the injection unit is coupled to a mold. Then, the injection piston is entered into the injection cylinder, wherein the check valve in the feed channel is pushed into a closed position and the material is pressed from the injection cylinder into the cavity of the mold. When the injection piston has completely entered the injection cylinder, the orifice of the feed channel is in connection with the discharge opening. After a certain time, the injection unit is separated from the mold by drawing the vulcanized piece out of the injection channel.

BRIEF SUMMARY OF THE INVENTION

The invention is based on the object of producing an injection molding device which is easy to operate. This object is achieved with the features of the claims.

An injection molding device of the invention in particular comprises an injection unit having an injection cylinder and an injection piston travelling therein. The injection cylinder is to be filled via a feed channel arranged in the injection piston and having at least one orifice. The injection cylinder is to be emptied via a discharge opening in the injection cylinder. The orifice of the feed channel is spatially and/or thermally separated from the discharge opening. This constitutes an advantage since the material in the feed channel is not affected by an elevated temperature when the injection unit is coupled to the mold. Particularly, the vulcanization process of the material in the discharge opening can thus be controlled. When the injection unit is decoupled from the mold, the vulcanized material which is sticking to the molded article is drawn from the discharge opening. The discharge opening is thus freed from residues. This surely avoids that material residues partially vulcanized to the molded article are filled into the mold in the next injection step. The injection molding device of the invention thus permits easier operation.

Preferably, the injection piston and the injection cylinder each comprise at least one sealing surface which come into engagement with each other in the inserted position of the injection piston. The advantage of this is that the orifice of the feed channel is sealed against the discharge opening in the injection cylinder when the injection piston is inserted. This ensures that the material which in the feed channel reaches up to the orifice is securely separated from the material filled into the mold. Further, an exactly measured amount of material is provided with the next filling of the injection cylinder.

Depending on the material to be processed, the temperature in the region of the feed channel is controlled in preferably such a manner that the material in the feed channel is prevented from vulcanizing. When the injection molding device is coupled to an injection mold, the contact points between the mold and the injection cylinder and between the injection cylinder and the injection piston are exposed to heat transitions. In one example, the temperatures are controlled in preferably such a manner that the mold has a temperature of approximately 180° C., the injection cylinder in the region of the discharge opening a temperature of approximately 120° C. and the injection piston in the region of the feed channel a temperature of approximately 80° C. The temperature is controlled by appropriate heating or cooling while taking into account the heat transition resistance and heat conductivity values of the individual components.

In a particular preferred embodiment, the free end of the injection piston is formed as a tapered tip and the bottom surface of the injection cylinder has a complementary shape. The front tip of the injection piston preferably partially projects into the discharge opening. This is advantageous since thus, it is achieved that when the injection piston is inserted, the filling in the injection cylinder is completely discharged via the discharge opening and, most preferably, the material in the discharge opening is discharged at least partially.

In a further preferred embodiment, the orifice of the feed channel is arranged in the tapered region of the injection piston at a distance from the tip.

In an advantageous embodiment of the invention, the free end of the injection piston is conically shaped and the bottom surface of the injection cylinder is complementarily conical and the discharge opening is arranged in the region of the tip. The orifice of the feed channel is arranged in the surface area of the conical end.

Preferably, an insert is arranged at the free end of the injection piston. This insert forms at least one portion of the tapering free end of the injection piston. The advantage resulting therefrom is that the insert can be made of a different material than the injection piston. Further, the insert can be produced and machined separately. Preferably, the insert is made of a heat-insulating material. In a further preferred embodiment, the injection cylinder comprises in the bottom region a mouth piece insert with the discharge opening, the mouth piece insert preferably being heat-insulating. The material used for the mouth piece insert is preferably chromium nickel steel such as V2A, V4A or ceramics of sintered materials. This is advantageous since when the injection unit is coupled to the mold, the conduction of heat from the discharge opening to the feed channel and, in particular, the orifice of the discharge opening can be interrupted or at least reduced.

According to one embodiment of the invention, a screw extruder is arranged in the injection piston preferably in an axial direction. In a further preferred embodiment, a check valve is arranged between the screw extruder and the feed channel. This check valve preferably closes automatically when the pressure in the injection cylinder is higher than in the region of the screw extruder.

The check valve is favorably arranged between the backward end of the insert and the free end of the screw extruder. This arrangement is advantageous since the feed channel in the injection piston has a small length and essentially corresponds to the length of the insert and because the check valve is easily accessible by removing the insert.

The invention will now be discussed in more detail with reference to an example and the drawing in which

Each part in the Figures always bears the same reference sign.

DETAILED DESCRIPTION OF THE INVENTION

The preferred embodiment of an injection molding device comprises an injection unit 1 essentially made up of an injection cylinder 20 and an injection piston 10 travelling therein. An insert 16 is arranged at the free end of the injection piston 10. The free end together with the insert is conically shaped. In the insert, a feed channel 12 is formed that has one inlet branching off into three outlets. The orifices 14 of the three outlets are each spaced from the tip and distributed along the circumference of the surface area of the insert at a distance of 120°.

The injection cylinder 20 is essentially formed as a hollow cylinder at whose free end is arranged a mouth piece 25. A mouth piece insert 26 is arranged at the mouth piece 25 and both have a conical surface towards the cylinder interior, which is complementary to the conical tip of the injection piston. An injection channel 22 with a discharge opening 24 is formed in the mouth piece insert 26. The mouth piece insert 26 is inserted with its upper portion into the mouth piece 25 preferably by screws. This makes a good heat-conducting connection to the mouth piece 25. The mouth piece 25 is kept in a temperature range of between 70° and 80° C. by tempering liquid in the channel system 39 depending on its adjustment. The lower portion of the mouth piece insert 26 projects freely from the mouth piece 25. In the region of the freely projecting portion of the mouth piece insert, the injection channel 22 comprises a diffusor section conically enlarging outwards.

In an alternative embodiment (not shown), the hollow cylinder and the mouth piece are integrally formed. Apart from that, its structure is the same as that of the arrangement described above.

The injection piston 10 can be moved within the injection cylinder 20 by a drive (not shown) between a retracted position and an inserted position in which the conical end of the injection piston contacts the conical surface in the mouth piece or mouth piece insert.

A plasticizing unit 3 is arranged in the injection piston 10. The plasticizing unit 3 essentially consists of a hollow cylinder 32 provided axially in the injection piston 10 and a screw extruder 30 arranged therein. An extruder inlet 34 is located in the region of the backward end of the screw extruder and an extruder outlet 36 is located in the region of the free end. The screw extruder is driven by a drive (not shown).

A check valve 40 is provided between the extruder opening 36 and the backward end of the insert 16. In the example, the check valve consists of a ball which closes the extruder outlet as soon as the pressure in the injection cylinder exceeds the pressure in the extruder. In the other direction, the passage is open.

A mold 5 consists of two parts which together form a mold cavity 52. The mold cavity 52 can be filled via an injection opening 54. A recess 56 is provided in the upper portion of the mold, into which the injection unit 1 can be inserted.

The preferred embodiment further comprises a closing bar 60 with which the discharge opening 24 of the injection cylinder 20 can be closed. The closing bar comprises a closing plate 62 which reciprocatably travels essentially vertically to the axial direction of the injection piston by means of a piston 64 travelling in a cylinder 66.

Subsequently, the operation of the injection molding device according to the invention is explained in more detail with respect to the drawing.

Figure 1:
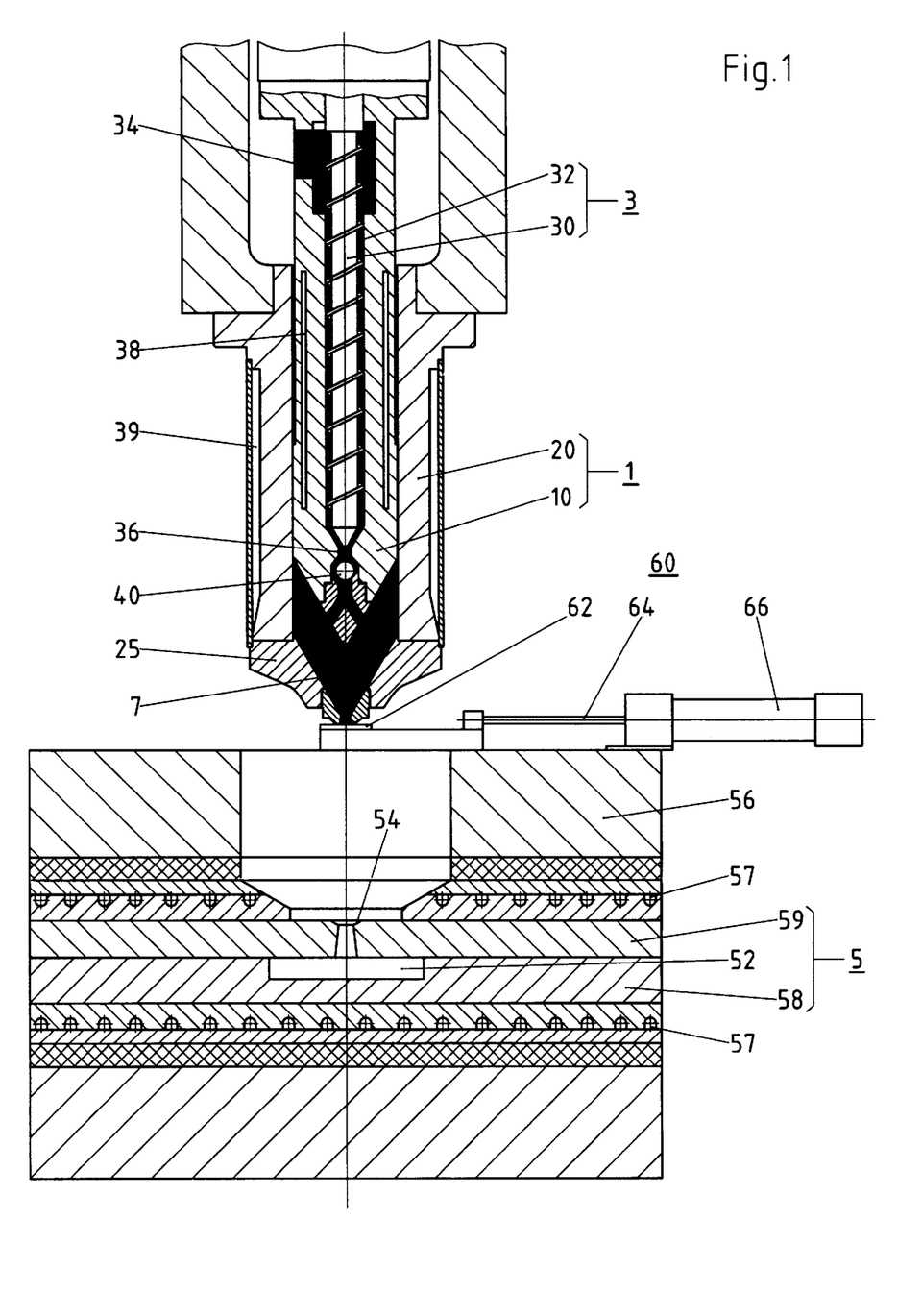
FIG. 1 is a preferred embodiment of the invention when the injection unit is filled.
Figure 1A:
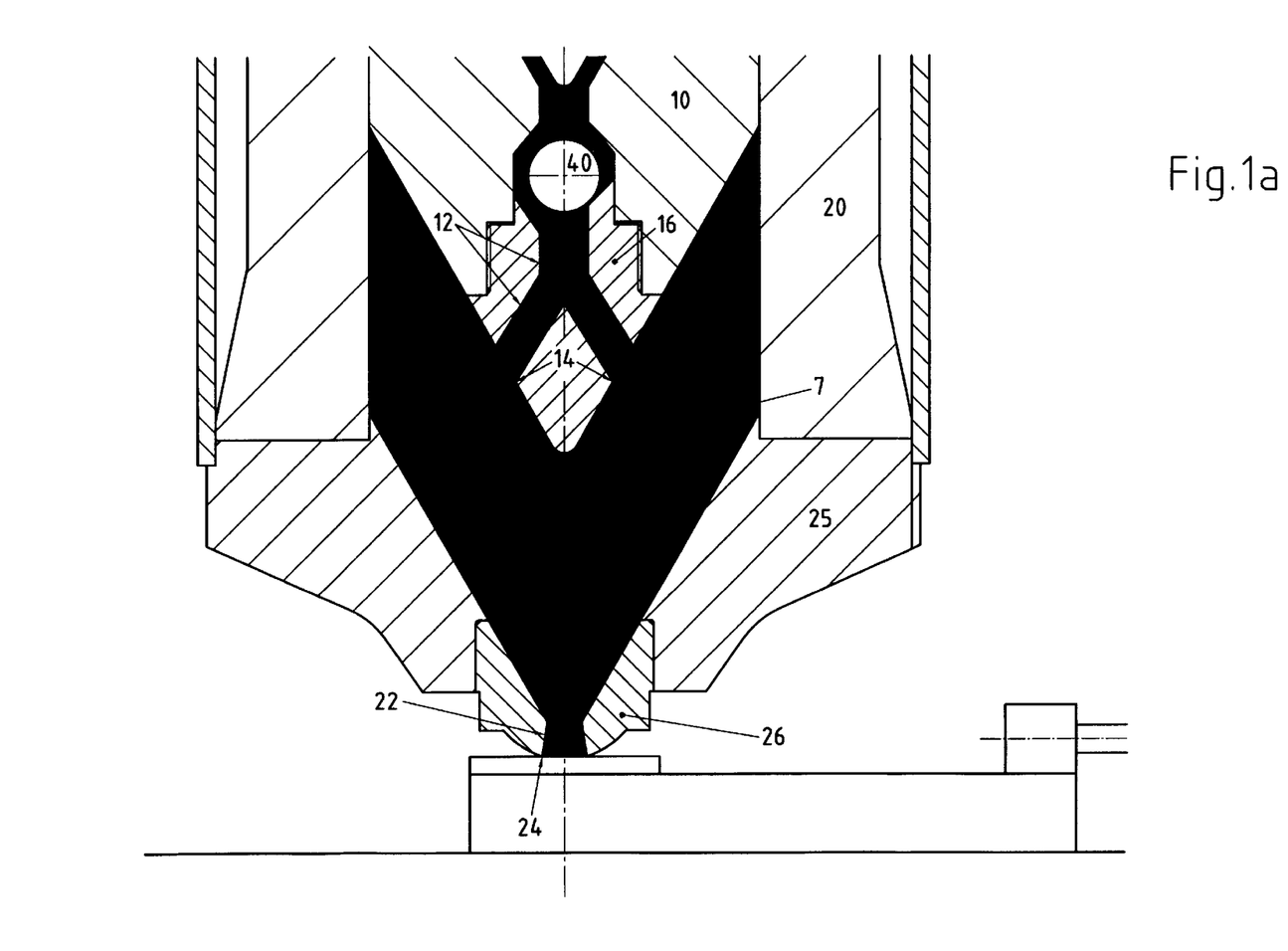
FIG. 1a is a detail of FIG. 1.

In FIGS. 1 and 1a, the discharge opening 24 is closed by that the closing plate 62 sealingly contacts the outside of the mouth piece insert 26. By operating the drive for the screw extruder 30, the material 7 is fed into the injection cylinder 20 via the extruder inlet 34 to the extruder outlet 36 and then via the feed channels 12. Simultaneously, the injection piston 10 is retracted by its drive and/or the pressure building up in the injection cylinder 20. This has the effect that the right amount of material 7 for the next injection is filled into the injection cylinder 20.

Figure 2:
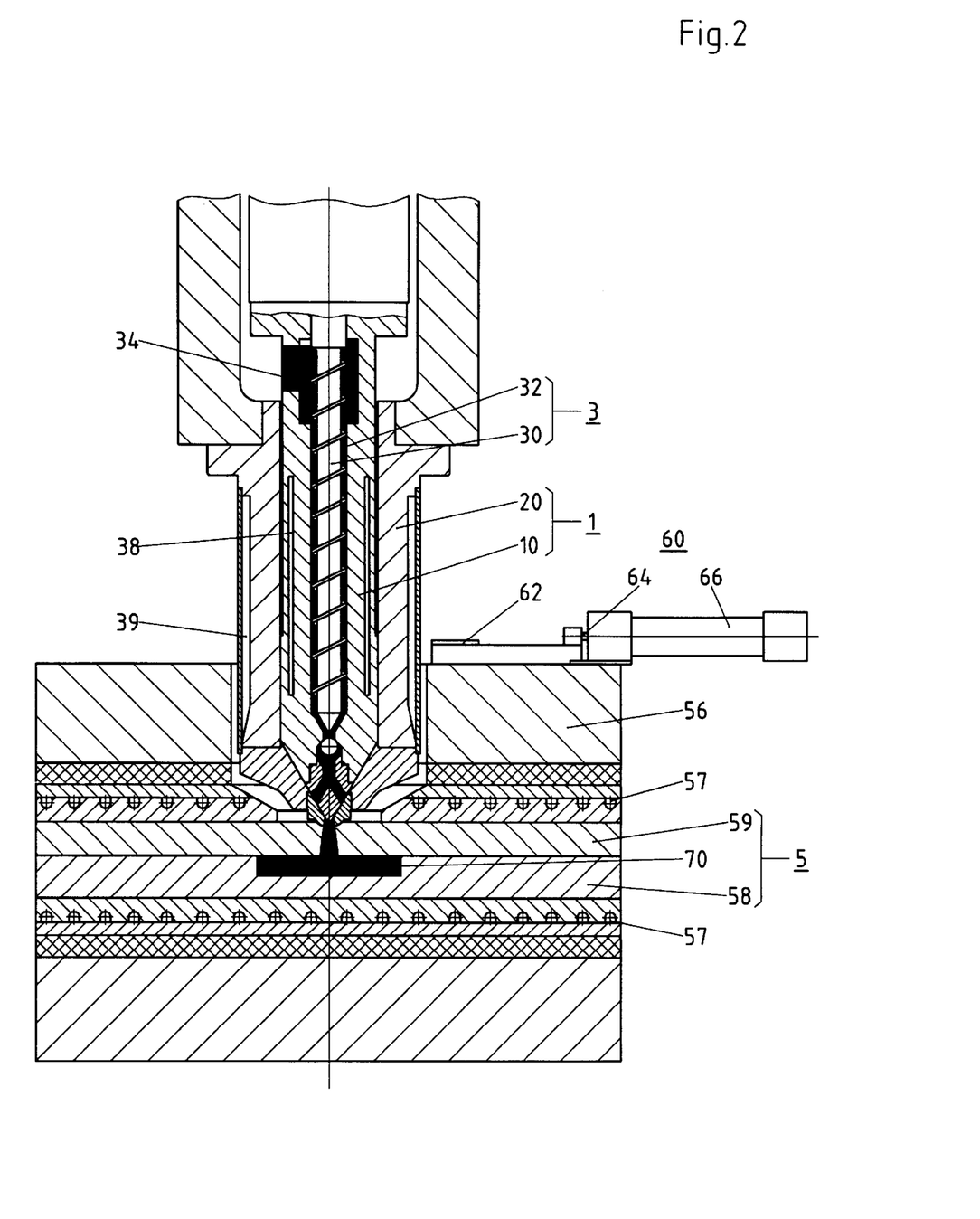
FIG. 2 is the preferred embodiment of FIG. 1 with the mold filled.
Figure 2A:
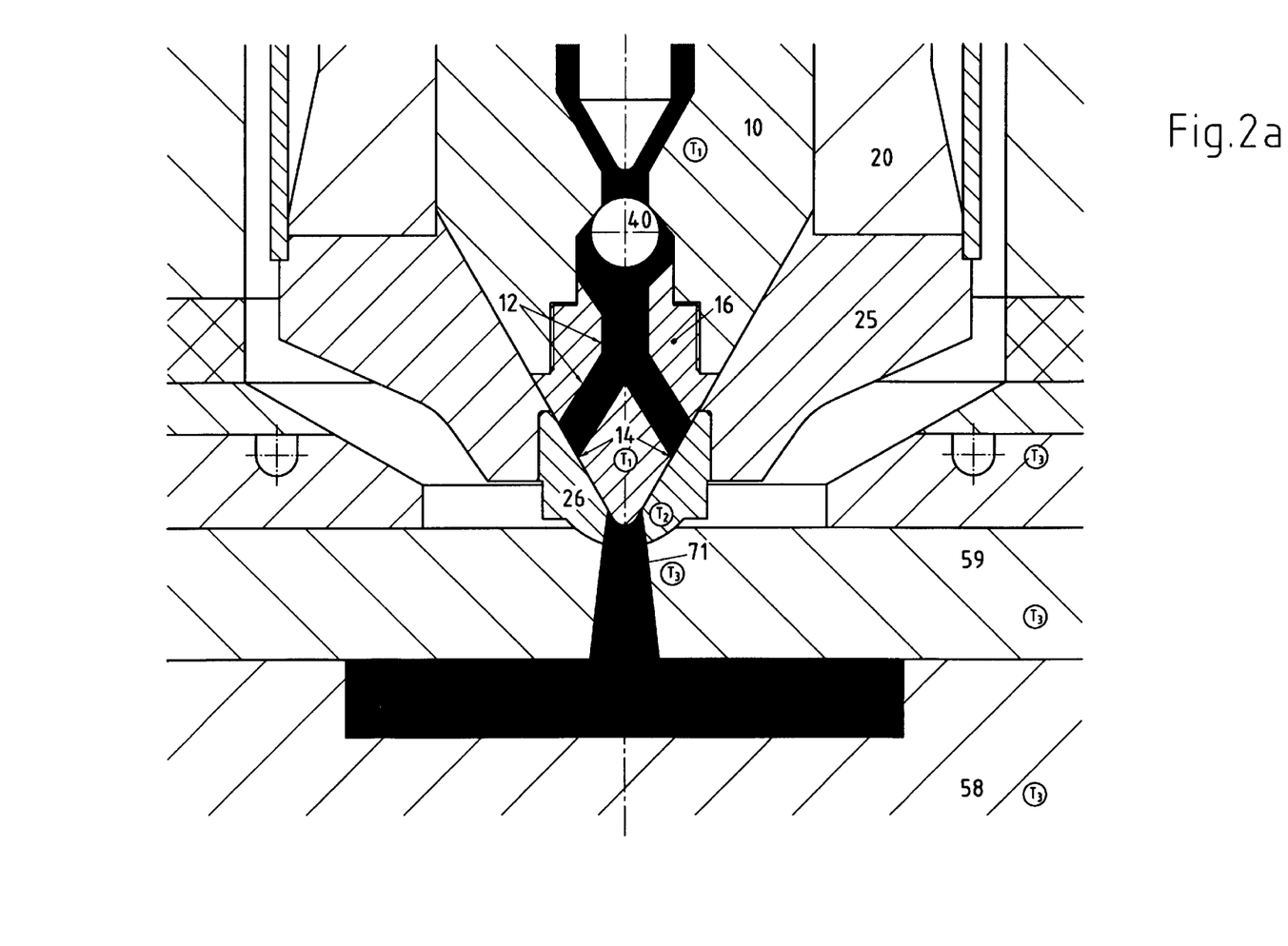
FIG. 2a is a detail of FIG. 2.

In FIG. 2 and 2a, the closing bar 60 is in its retracted position. The injection unit 1 has been inserted into the recess 56 of the mold 5 and coupled to the mold 5. The injection channel 22 is in contact with the injection opening 54. The injection piston 10 is completely inserted into the injection cylinder 20 so that the whole material is pressed into the mold cavity 52. During the insertion of the injection cylinder, the check valve 40 seals the feed channel 12 against the extruder outlet 36. In the completely inserted position of the injection piston, the conical end of the injection piston sits closely to the conical recess in the mouth piece 25. In particular, the tip of the insert 16 sits closely to and thus seals the mouth piece insert 26. Thus, the material 7 in the feed channel 12 is completely separated from the material 70, 71 in the injection channel 22 or in the mold cavity 52.

FIG. 2a indicates the temperatures $T_1$, $T_2$, and $T_3$. The temperature $T_1$ essentially corresponds to the temperature suitable for plasticizing the material. Preferably, this is done at a temperature $T_1$ of 60 to 90° C., more preferably 70 to 80° C.

The temperature $T_3$ essentially corresponds to the temperature suitable for vulcanizing the material in the mold. The temperature preferably is in the range of 160 to 180° C. The temperature $T_2$ is between the temperature $T_1$ and the temperature $T_3$. Preferably, it is approximately 120° C. The temperature control in the region of the injection cylinder and in the region of the injection piston particularly in the region of the feed channels serves for adjusting the temperature $T_1$. In the Example, the injection piston 10 comprises a channel system 38, through which a fluid having a certain temperature flows. The injection cylinder further comprises a channel system 39 through which the same or another fluid having an appropriate temperature flows. The temperature of the mold $T_3$ is controlled by means of a heater plate 57, which is arranged at the lower side of the lower mold part 58 and at the upper side of the upper mold part 59. Several plates are arranged at the outer surfaces of the heater plates 57. These plates especially have heat-insulating properties. The upper portion of the mouth piece insert has a good heat-conductive connection to the mouth piece 25 and the lower portion 26 projects freely from the mouth piece 25. Thus, if the lower portion of the mouth piece 26 remains on the plate 59 ($T_3$) for a sufficient period of time, the mass in the injection channel 22 is sufficiently vulcanized and is drawn out of the injection channel when the mouth piece insert 26 is lifted from plate 59. The injection channel is thus available for the next injection process. The temperature of the lower portion of the mouth piece insert 26 is $T_2$.

Figure 3:
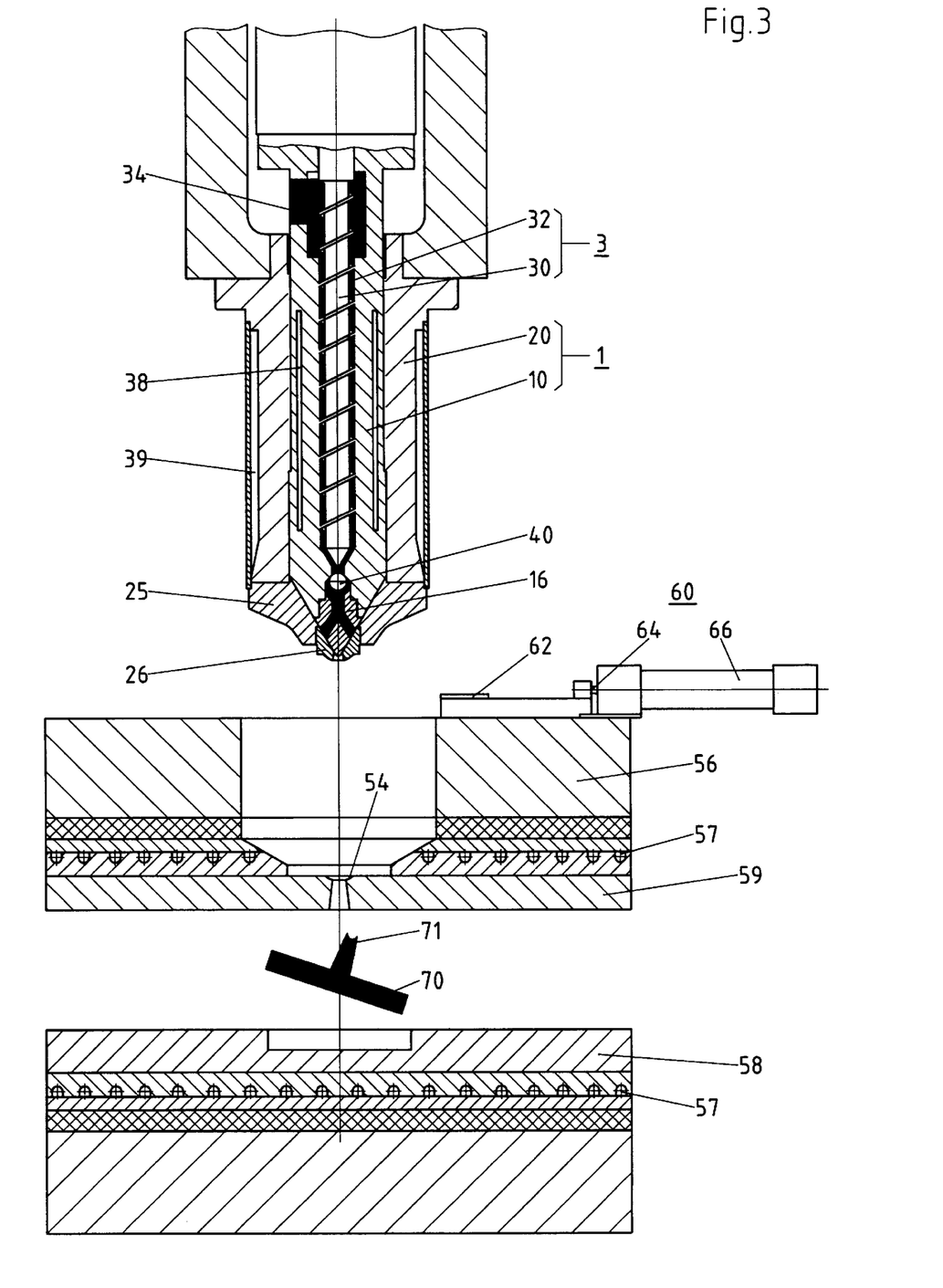
FIG. 3 is the preferred embodiment of FIG. 1 after decoupling of the injection unit and opening of the mold.
Figure 3A:
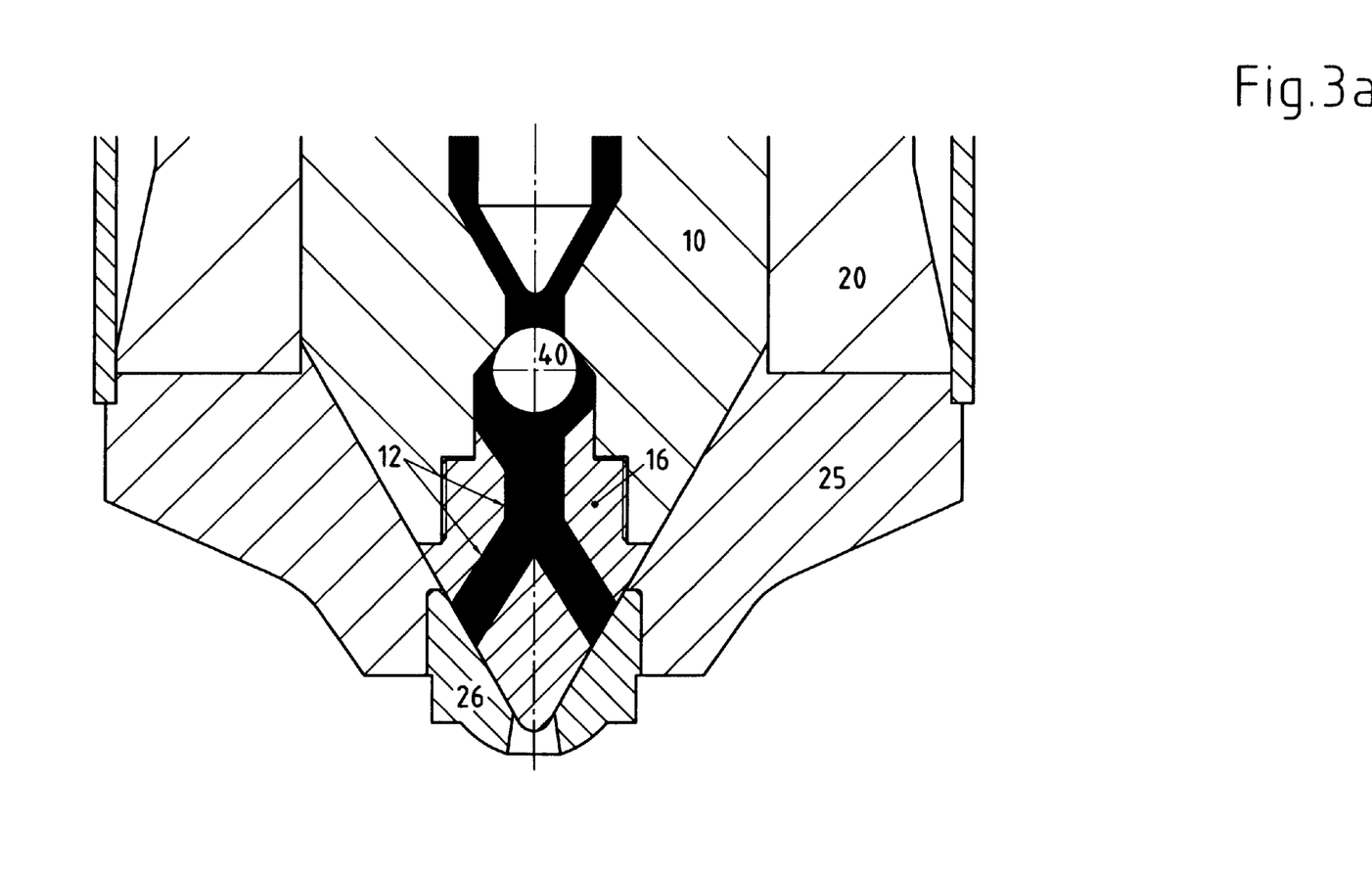
FIG. 3a is a detail of FIG. 3.

In FIGS. 3 and 3a, the injection unit 1 is decoupled from the mold 5 and the upper mold part 58 is separated from the upper mold part 59 and the molded article 70 taken out of the mold. The molded article 70 shows the vulcanized end 71, which has been drawn out of the injection channel 22 or the discharge opening 24 and the injection opening 54 when separating the mold parts. The injection channel 22 and the injection opening 54 are free from residues. The injection molding device is thus available for the next injection process.

The invention in particular has the advantage that the material in the feed channel is not impaired when coupling the injection unit with the mold. In particular, the invention ensures that the material is not vulcanized to get stuck in the feed channel. Preferably, the material is kept at the plasticizing temperature of about 70 to 80° C. in the plasticizing unit 3 and in the feed channel 12. In the mold, the material is heated to a temperature of about 160 to 180° C. required for vulcanizing. The orifices of the feed channels are thermally separated from the discharge opening so that the material in the feed channels is not thermally impaired. Preferably, the insert 16 is produced from a heat-insulating material. The spatial separation ensures that the material in the feed channels is not affected by inappropriate temperatures.

According to an embodiment of the invention, the mouth piece insert 26 is a heat-insulating one. Preferably, the mouth piece insert 26 is made from a heat-insulating material, preferably CrNi steel such as V2A, V4A, or ceramics of sintered materials. Alternatively or as an additional measure, the inner surface of the mouth piece insert 26 has a heat-insulating coating.

The basic idea of the present invention consists in the spatial and/or thermal separation of the material in the feed channel 12 and in the injection channel 22. The injection molding device of the invention has a simple and compact structure and is easy to operate.

What is claimed is:

1. An injection molding device comprising:

an injection unit having an injection cylinder and an injection piston travelling therein;

wherein the injection piston is tapered towards its free end and comprises a tip;

wherein the injection cylinder can be charged via a feed channel arranged in the injection piston and discharged via a discharge opening in the injection cylinder;

wherein the feed channel comprises at least one orifices;

wherein a bottom surface of the injection cylinder is formed complementary to the injection piston;

wherein the discharge opening is formed in the bottom surface of the injection cylinder so that the tip of the injection piston projects at least partially into the discharge opening; and wherein the distance between the orifice and the discharge opening is such that the temperature ($T_1$) in the region of the feed channel is controlled so that vulcanization of material in the feed channel is prevented.

2. The injection molding device according to claim 1, wherein at least one of the injection piston and the injection cylinder comprises at least one sealing surface which separates the orifice from the discharge opening in the inserted position of the injection piston.

3. The injection molding device according to claim 1, wherein the orifice of the feed channel is arranged in the tapered region of the injection piston.

4. The injection molding device according to claim 3, wherein the free end of the injection piston is conical and that the orifice of the feed channel in the conical surface area is spaced apart from the tip and the bottom surface of the injection cylinder is conical and the discharge opening is arranged near the tip.

5. The injection molding device according to claim 1, wherein an insert is arranged at the free end of the injection piston.

6. The injection molding device according to claim 5, wherein the insert is produced from a heat-insulating material.

7. The injection molding device according to claim 5, wherein the insert is made from one of chromium nickel steel or ceramics.

8. The injection molding device according to claim 1, wherein the injection cylinder comprises a mouth piece in the bottom area, the mouth piece having a mouth piece insert comprising the discharge opening.

9. The injection molding device according to claim 8, wherein the mouth piece insert is in a good heat-conducting connection to the mouth piece in a first region and projects from the mouth piece in another region.

10. The injection molding device according to claim 1, wherein the temperature ($T_1$) in the region of the feed channel is suitable for plasticizing the material and is preferably in the range approximately 70 to 80° C.

11. The injection molding device according to claim 1, wherein a means controls the temperature near the discharge opening in such a way that the material which is introduced into a mold during injection is vulcanized up to the discharge opening and thus the vulcanized material in the discharge opening is drawn from the discharge opening together with the sprue when the mold is opened.

12. The injection molding device according to claim 1, wherein the mouth piece insert is produced from a heat-insulating material.

13. The injection molding device according to claim 12, wherein the mouth piece insert is made from one of chromium nickel steel or ceramics.

14. The injection molding device according to claim 1, wherein the inner surface of the mouth piece insert comprises a heat-insulating coating.

15. The injection molding device according to claim 14, wherein the coating is made from one of chromium nickel steel or ceramics.

* * * * *